INVENTORS
DAVID I. CROPP
CHALMER C. JORDAN
ROBERT W. LINGO

BY Charles L Lovercheck
attorney

March 17, 1964  D. I. CROPP ETAL  3,124,861
BEAD LOADER FOR AN ASSEMBLY MACHINE

Filed Oct. 8, 1959  3 Sheets-Sheet 2

INVENTORS
DAVID I. CROPP
CHALMER C. JORDAN
ROBERT W. LINGO

BY Charles L. Lovenluch
ATTORNEY

March 17, 1964

D. I. CROPP ETAL 3,124,861

BEAD LOADER FOR AN ASSEMBLY MACHINE

Filed Oct. 8, 1959

INVENTORS
DAVID I. CROPP
CHALMER C. JORDAN
ROBERT W. LINGO

BY Charles L. Loveshok
ATTORNEY

United States Patent Office 3,124,861
Patented Mar. 17, 1964

3,124,861
BEAD LOADER FOR AN ASSEMBLY MACHINE
David I. Cropp, Meadville, Chalmer C. Jordan, Saegertown, and Robert W. Lingo, Meadville, Pa., assignors, by mesne assignments, to Saegertown Glasseals, Inc., Saegertown, Pa., a corporation of Delaware
Filed Oct. 8, 1959, Ser. No. 845,132
7 Claims. (Cl. 29—25.3)

This invention relates to assembly machines and, more particularly, to a machine for assembling parts, including interfitting parts such as transistors.

This application is a continuation in part of patent application, Serial No. 740,966, filed June 9, 1958.

The previous application discloses a machine for assembling transistor parts, including a bead loader in combination therewith.

In the present application, such a machine is disclosed having an improved bead loader thereon. The bead loader disclosed herein is considerably simplified, yet accomplishes the same purpose and is deemed to be an improvement over the bead loader and combination thereof with the machine disclosed in the said prior application.

The bead loader disclosed herein is simpler in construction, more economical and, in many applications, more trouble free than that disclosed in the parent application.

Accordingly, it is an object of the present invention to provide an improved machine for loading beads onto wires.

Another object of the invention is to provide an improved machine for beading and disposing glass beads over precut pieces of wire in an assembly process.

Still another object of the invention is to provide an improved bead loader.

A further object of this invention is to provide a bead loader which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
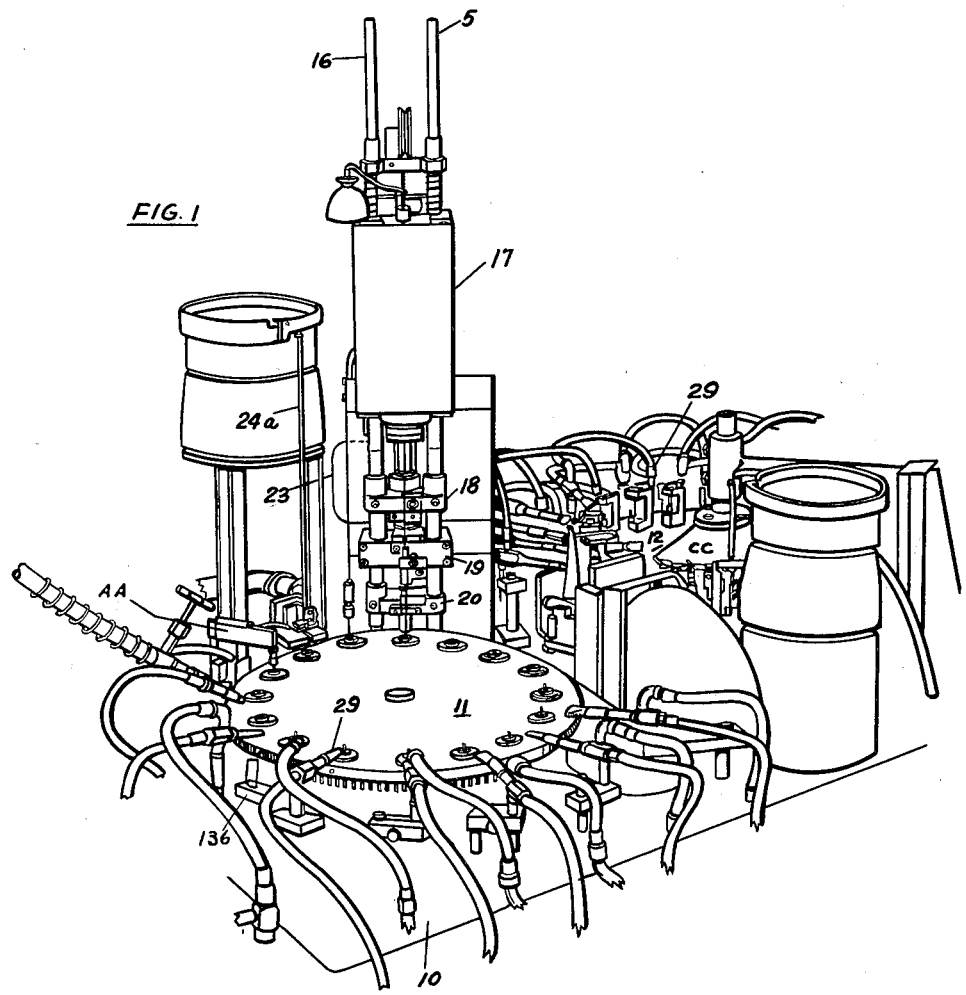
FIG. 1 is a view of a machine with the improved bead loader supported thereon, being in most respects identical to the machine disclosed in the parent application but having the improved bead loader supported thereon.
Figure 2:
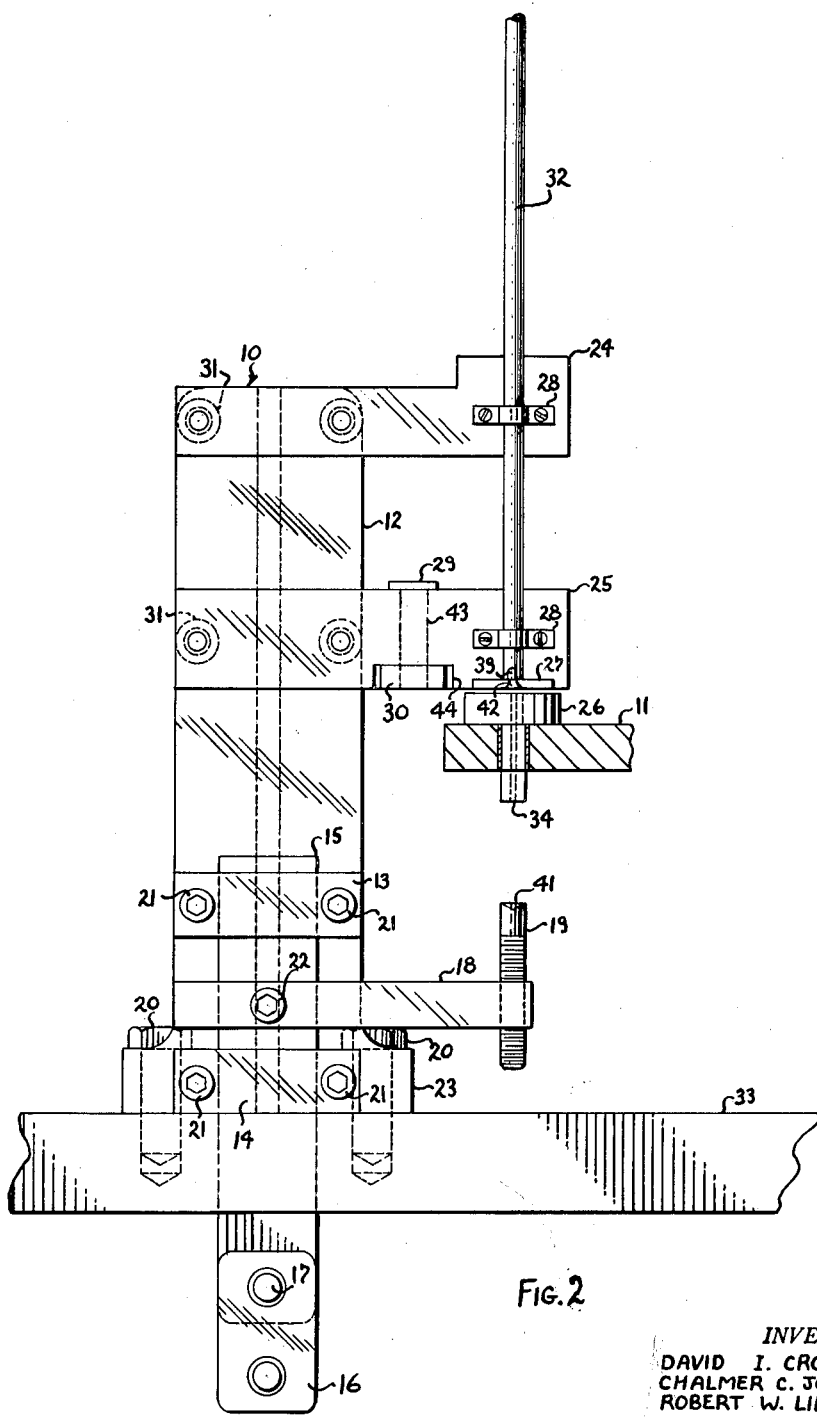
FIG. 2 is a side view partly broken away and partly in cross section of the bead loader disclosed herein.

Now with more specific reference to the drawings, FIGS. 1 to 4 show a machine made up generally of a frame 33 supporting a wire and bead assembly turret 11 and a glass tube and bead assembly turret 61. The turrets 11 and 61 are fixed to axles 59 and 60, respectively. Connecting means is provided to selectively and intermittently rotate the turrets 11 and 61 about their respective axes and stop them at the respective loading, fusing, and sealing stations at predetermined intervals.

Two spaced, parallel, vertically extending columns 55 and 56 support a wire straightening mechanism 53, a wire measuring device 62, a clamp and cut-off 63, and a wire loader 64. The columns 55 and 56 are, in turn, themselves fixed to the frame 33 at their lower ends and support at their upper ends a guide sheave 54 which guides Dumet wire from a spool. The wire straightener 53 is rotated at a constant rate of speed by an electric motor.

Feeders 65 and 66 may be of the type shown in Patent No. 2,609,914. The beads are fed to the assembling position on the turret 11 by means of the vibratory type bowl feeder 65 which feeds the beads in oriented position, with their holes aligned with the wire, down a chute to their assembled position on the wire.

The glass tube assembly turret 61 has a larger number of loading stations than the bead loading assembly turret 11 in order that each loading station of the bead loader will remain in the heat a longer period of time to properly cure the assemblies which are of greater size and volume than the assembly made up of all of the components after the tube is assembled.

Wire rotating assemblies or chucks 26 are spaced around the upper outer periphery of the glass tube assembly turret 61 on the upper surface and the axle 60 is rotatably supported on a bearing under the table supported on the fixed frame 33.

Spaced gas burner jets 58 are attached to the frame 33 and disposed around the periphery of both the head loading turret 11 and the tube loading turret 61. The gas jets 58 heat the glass and seal the beads to the wire and, subsequently, the gas jets 58 disposed around the turret 61 seal the beads to the inside of the glass tubes.

A bead loader 10 is supported on the frame 33 and is attached thereto by studs 20 which pass through a base 23 of a bead loader support 12. A push rod 15 is received in brackets 13 and 14 in the bead loader support 12 and extends downwardly through a clearance slot in the frame 33. The rod 15 has a push rod clevis 16 attached to its lower end by a clevis pin 17. The brackets 13 and 14 are attached to the support 12 and the base 23 by studs 21. The push rod 15 is guided in its upward and downward movement by the brackets 13 and 14.

A push rod arm 18 is rigidly fixed to the push rod 15 by a stud 22. The distal end of the push rod arm 18 has a threaded hole which receives a push rod set screw 19 which has a flat surface 41 on its upper end.

A lower tube support bracket 25 is attached to the upper portion of the bead loader support or bracket 12 by studs 31 firmly fixing it thereto. An upper tube support bracket 24 is held in place spaced above the bracket 25. A tube 32 is attached to the distal ends of the brackets 24 and 25 by clamps 28 as shown.

A bottom plate 27 is received in a recess in the bottom section of the bracket 25 and it has a lateral guide slot 42 formed therein in line with a slot 39 in one side of the tube 32. The slot 39 is slightly wider and higher than a single head so that a single bead may be freely moved therethrough. The tube 32 is supported on the bottom plate 27 and its end may abut against the plate 27. The center of the hole through the tube 32 is directly over the slot 42.

Figures 3, 4:
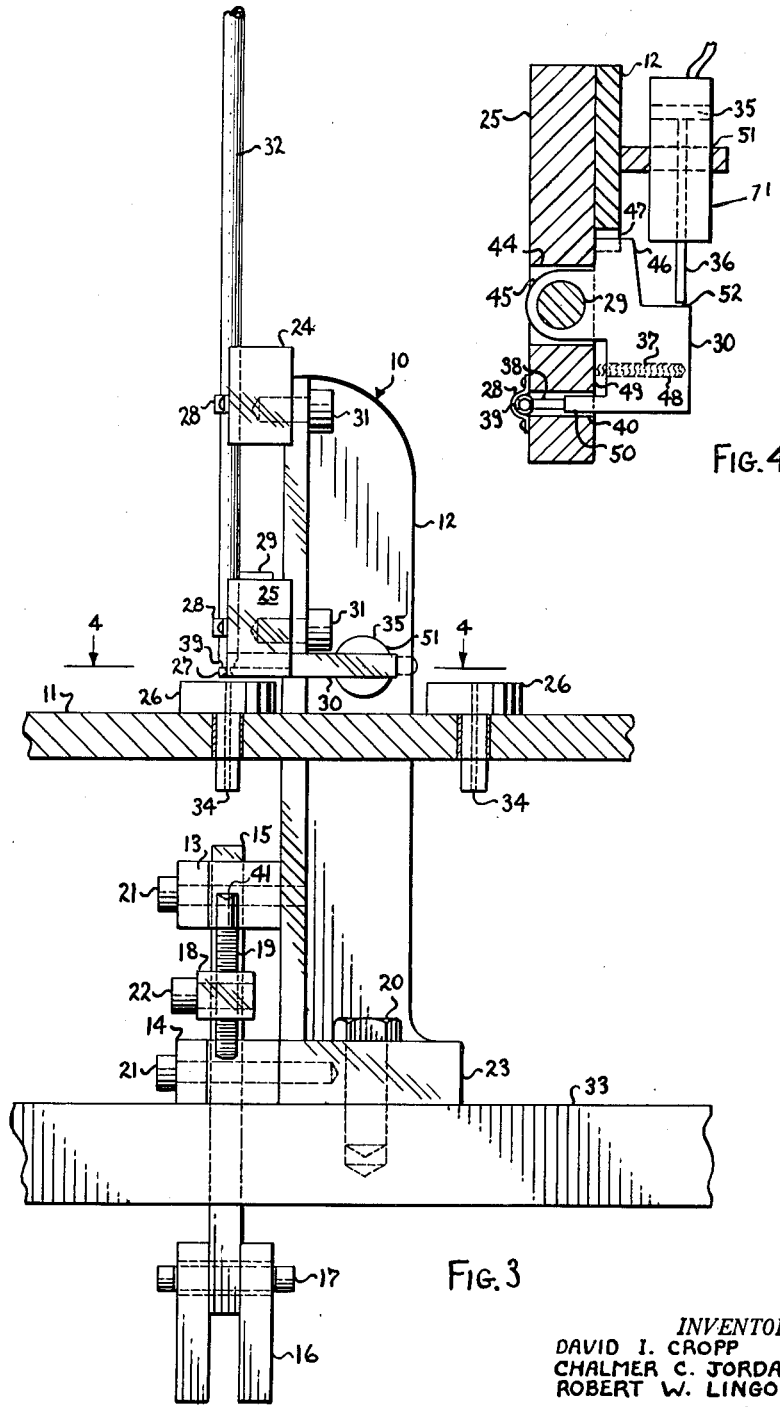
FIG. 3 is a front view of the bead loader shown in FIG. 2.
FIG. 4 is a top view of the ejector arm with the supports broken away taken on line 4—4 of FIG. 3.

An ejector mechanism is provided which can be actuated to remove jammed beads from the bead loader. The ejector is best shown in FIG. 4. The bracket 25 is bored at 43 to receive an ejector arm pin 29. A slot 44 in the bracket 25 receives a lug 45 of an ejector arm 30. The ejector arm 30 has an arm 46 which engages the bracket 25 in the position shown and forms a stop to limit the swinging of the arm 30. A slot 47 is machined in the bead loader support 12 to form a clearance space for the arm 46.

A spring 37 is disposed in a blind hole 48 in the ejector arm 30. One end of the spring 37 rests against a back surface 49 of the bracket 25. The spring 37 resets the ejector arm 30 to the striking position in which it is shown. The ejector arm 30 has an integral extending boss 50 to which an ejector pin 38 is attached. The boss 50 and the ejector pin 38 are received in a slot 40. The ejector pin 38 is urged to swing through the slot 39 in the tube 32. The arm 30 is swung through the slot 40 by a piston 35 to clear the tube 32 of defective or jammed beads.

The ejector arm 30 is engaged by the piston 35 which is housed in a cylinder 71 supported in a hole 51 of the bead loader support 12. The piston 35 has a piston rod 36. The piston rod 36 strikes a surface 52 of the ejector arm 30 when the piston 35 is actuated, driving the ejector pin 38 through the slot 39 in the tube 32 and thereby clearing the bead passage of any jammed or defective bead. A manually operated control for the piston 35 is provided.

In operation, beads are fed with their holes aligned with the axis of the tube 32 and fed into the tube 32 from a vibrating hopper feeder or other suitable feeding mechanism. The bottom bead in the tube comes to rest on the top of the bottom plate 27 with the hole in the bead in line with and above the slot 42 of the bottom plate 27.

Wire chucks 26 are rotated continuously in the turret 11. Short lengths of wire are fed into the wire chucks 26 by the wire feeding mechanism. As the turret indexes, the chucks 26 are stopped in position directly under the bottom plate 27 and the bead tube 32. The machine is so timed that the push rod 15 is actuated by a crank controlled from a cam under the turret. The push rod arm 18 and the push rod set screw 19 move upwardly and the end of the surface 41 of the push rod set screw 19 pushes the short length of wire up through the hole in the bead. The friction between the wire and the chuck 26 will hold it in position. The crank then withdraws the push rod 15.

The next index of the turret will move the wire chuck 26 to the next position where the next burner 58 will seal the bead to the wire. As the turret indexes, the bead which has received the wire passes through the slot 39 in the tube 32 and the wire passes through the slot 42 in the bottom plate 27.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A bead loader comprising a base, a table supported on said base, wire receiving means on said table, tube means on said base adapted to contain beads, means to move said table to carry a wire supported in said wire receiving means to a position adjacent said tube means, a lateral slot in said tube means, a closure over the end of said tube means adjacent said wire, a central slot in said closure, said central slot being slightly wider than the diameter of said wire, means to move said wire upwardly in said receiving means to move an end of said wire through said slot in said closure and into the holes in said beads, and means to move said table with said wire thereon to move said beads with said wire therein through said lateral slot in said closure.

2. The bead loader recited in claim 1 wherein said table is rotatably supported on said base and said wire receiving means is disposed adjacent the edge of said table.

3. A bead loader comprising a support, a plate on said support, a slot through said plate, means to guide beads to said support to bring said beads to rest on said plate with the holes in said beads overlying said slot, means to move a wire through said slot into said hole in each said bead and to carry said beads off of said plate.

4. The bead loader recited in claim 3 wherein said wire is supported on a rotatable chuck on the outer portion of a table and push up means is provided comprising a member disposed below said table and adapted to engage a lower end of said wire to push it into each said bead.

5. A machine for assembling beads on cut lengths of wire comprising a support, a table on said support rotatable about a horizontal axis, a bead loader disposed above said table at one edge thereof, wire supporting members spaced around the outer edge of said table, means to cut wire into pieces of predetermined length and to load said pieces of wire into said wire supporting members, said bead loader comprising a plate on said support, a slot through said plate, means to guide beads to said support to bring said beads to rest on said plate with the holes in said beads overlying said slot, and means to move a piece of wire through said slot into said hole in each said bead and to carry said beads off of said plate.

6. The machine recited in claim 5 wherein said table has means to rotate it intermittently, and heating means spaced around said table for hermetically sealing said beads to said wires.

7. A machine for cutting wire into short pieces and sealing beads to said wire comprising a support, means on said support to cut said wire, a table rotatable on said support from a loading position to a bead loading position and from a bead loading position to a bead heating and sealing position comprising bead feeding means on said support, means on said support to insert said wire pieces into wire supporting means on said table, means to move said table with said wire to bring said wire into alignment with openings in said beads, said bead feeding means comprising a plate on said support, a slot through said plate, means to guide said beads to said support to bring said beads to rest on said plate with the holes in said beads overlying said slot, and means to move a said wire through said slot into said hole in each said bead and to carrying said beads off of said plate.

References Cited in the file of this patent

UNITED STATES PATENTS

| | | |
|---|---|---|
| 1,733,881 | Illingworth | Oct. 29, 1929 |
| 1,947,449 | Anderson et al. | Feb. 20, 1934 |
| 2,691,246 | Roeber | Oct. 12, 1953 |
| 2,715,764 | Pierce | Aug. 23, 1955 |
| 2,821,011 | Sanders et al. | Jan. 28, 1958 |